US012688696B2

(12) United States Patent
Ding et al.

(10) Patent No.: US 12,688,696 B2
(45) Date of Patent: Jul. 21, 2026

(54) SYNCHRONISED SENSOR FUSION PIPELINE

(71) Applicant: Cubic Corporation, San Diego, CA (US)

(72) Inventors: Baoming Ding, Richmond Hill (CA); Yixin Huangfu, Toronto (CA); Steffen Reymann, Guildford (GB)

(73) Assignee: Cubic ITS, Inc., Sugar Land, TX (US)

( * ) Notice: Subject to any disclaimer, the term of this patent is extended or adjusted under 35 U.S.C. 154(b) by 288 days.

(21) Appl. No.: 18/523,458

(22) Filed: Nov. 29, 2023

(65) Prior Publication Data

US 2024/0177491 A1     May 30, 2024

Related U.S. Application Data

(60) Provisional application No. 63/428,693, filed on Nov. 29, 2022.

(51) Int. Cl.
   G06V 20/54     (2022.01)
   G06V 10/80     (2022.01)
   G01S 13/89     (2006.01)

(52) U.S. Cl.
   CPC ............ G06V 20/54 (2022.01); G06V 10/811 (2022.01); G01S 13/89 (2013.01)

(58) Field of Classification Search
   CPC ........ G06V 20/54; G06V 10/811; G01S 13/89
   See application file for complete search history.

(56) References Cited

U.S. PATENT DOCUMENTS

2023/0249712 A1 * 8/2023 Chen ...................... G06V 20/58
701/26

FOREIGN PATENT DOCUMENTS

EP      2 323 105 A1 * 5/2011 ............... G07C 3/08

OTHER PUBLICATIONS

Huang et al, "Multi-modal Sensor Fusion for Auto Driving Perception: A Survey," Feb. 27, 2022, arXiv:2202.02703v2 (14 Pages) (Year: 2022).*

* cited by examiner

*Primary Examiner* — David F Dunphy
(74) *Attorney, Agent, or Firm* — MUGHAL GAUDRY & FRANKLIN PC

(57) ABSTRACT

A method for performing traffic monitoring by utilizing distinct sensors is disclosed. A radar point cloud is obtained from a radar sensor and image data is obtained from an image sensor. The radar sensor and the image sensor are fixedly mounted to observe traffic. The radar sensor and the image are synchronized for managing a flow of data for the radar sensor and the image sensor. A first classifier is applied on the first dataset to generate first classifications. A second classifier is applied on the second dataset to generate second classifications. The first classifications and the second classifications from the radar sensor and the image sensor are integrated to generate a composite classification.

18 Claims, 5 Drawing Sheets

SYNCHRONISED SENSOR FUSION PIPELINE

PRIORITY

This application is a non-provisional of and claims priority to U.S. Provisional Patent Application No. 63/428,693, filed Nov. 29, 2022, the contents of which is incorporated herein by reference in its entirety.

BACKGROUND

This disclosure generally relates to traffic monitoring systems and, not by way of limitation, monitoring traffic at intersections.

Traffic monitoring systems serve the purpose of observing and managing vehicular movement on roads and highways. The traffic monitoring systems often utilize a network of sensors and data processing techniques to gather real-time traffic information, detect congestion, monitor vehicle speeds, manage traffic flow, and facilitate route optimization. By analyzing real-time traffic information, for example, authorities can make informed decisions to enhance transport efficiency and safety.

SUMMARY

In one embodiment, a method for performing traffic monitoring by utilizing distinct sensors is disclosed. A radar point cloud is obtained from a radar sensor and image data is obtained from an image sensor. The radar sensor and the image sensor are fixedly mounted to observe traffic. The radar sensor and the image are synchronized for managing a flow of data for the radar sensor and the image sensor. A first classifier is applied on the first dataset to generate first classifications. A second classifier is applied on the second dataset to generate second classifications. The first classifications and the second classifications from the radar sensor and the image sensor are integrated to generate a composite classification.

In another embodiment, a method for performing traffic monitoring by utilizing distinct sensors is disclosed. The method comprises obtaining a first dataset from a radar sensor. The first dataset includes a first spatial coordinates and velocity of a plurality of traffic objects. The radar sensor is fixedly mounted to observe traffic. A second dataset is obtained from an image sensor. The second dataset includes a second spatial coordinates of the plurality of traffic objects. The image sensor is fixedly mounted to observe the traffic. The radar sensor is synchronized with the image sensor for managing a flow of data for the radar sensor and the image sensor. A first classifier is applied on the first dataset to generate first classifications. A second classifier is applied on the second dataset to generate second classifications. The first classifications and the second classifications from the radar sensor and the image sensor are integrated to generate a composite classification.

In still embodiment, a system for performing traffic monitoring by utilizing distinct sensors is disclosed. The system comprises a radar sensor configured to obtain a first dataset. The first dataset includes a first spatial coordinates and velocity of a plurality of traffic objects. The radar sensor is fixedly mounted to observe traffic. An image sensor is configured to obtain a second dataset. The second dataset includes a second spatial coordinates of the plurality of traffic objects. The image sensor is fixedly mounted to observe the traffic. A fusion processor is communicatively coupled to the radar sensor and the image sensor to synchronize the radar sensor with the image sensor for managing a flow of data for the radar sensor and the image sensor. The fusion processor is further configured to apply a first classifier on the first dataset to generate first classifications. The fusion processor is further configured to apply a second classifier on the second dataset to generate second classifications. The fusion processor is further configured to integrate the first classifications and the second classifications from the radar sensor and the image sensor to generate a composite classification.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second alphabetical label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Embodiments described herein are generally related to systems and methods for monitoring traffic by utilizing data from different sensors. In particular, some embodiments of the disclosure describe fusing multiple features from data of different sensors, such as a radar sensor and an image sensor. A point-cloud data from the radar sensor is integrated with image data from the image sensor.

The integration of the point-cloud data and the image data provides a comprehensive and multi-dimensional view of traffic conditions. Combining the point-cloud data with the image data provides a more detailed and robust understanding of the traffic environment. This fusion enhances accuracy in object detection, especially in low-light environments, facilitates better trajectory analysis, and enables more informed decision-making for efficient traffic management and safety measures.

Figure 1:
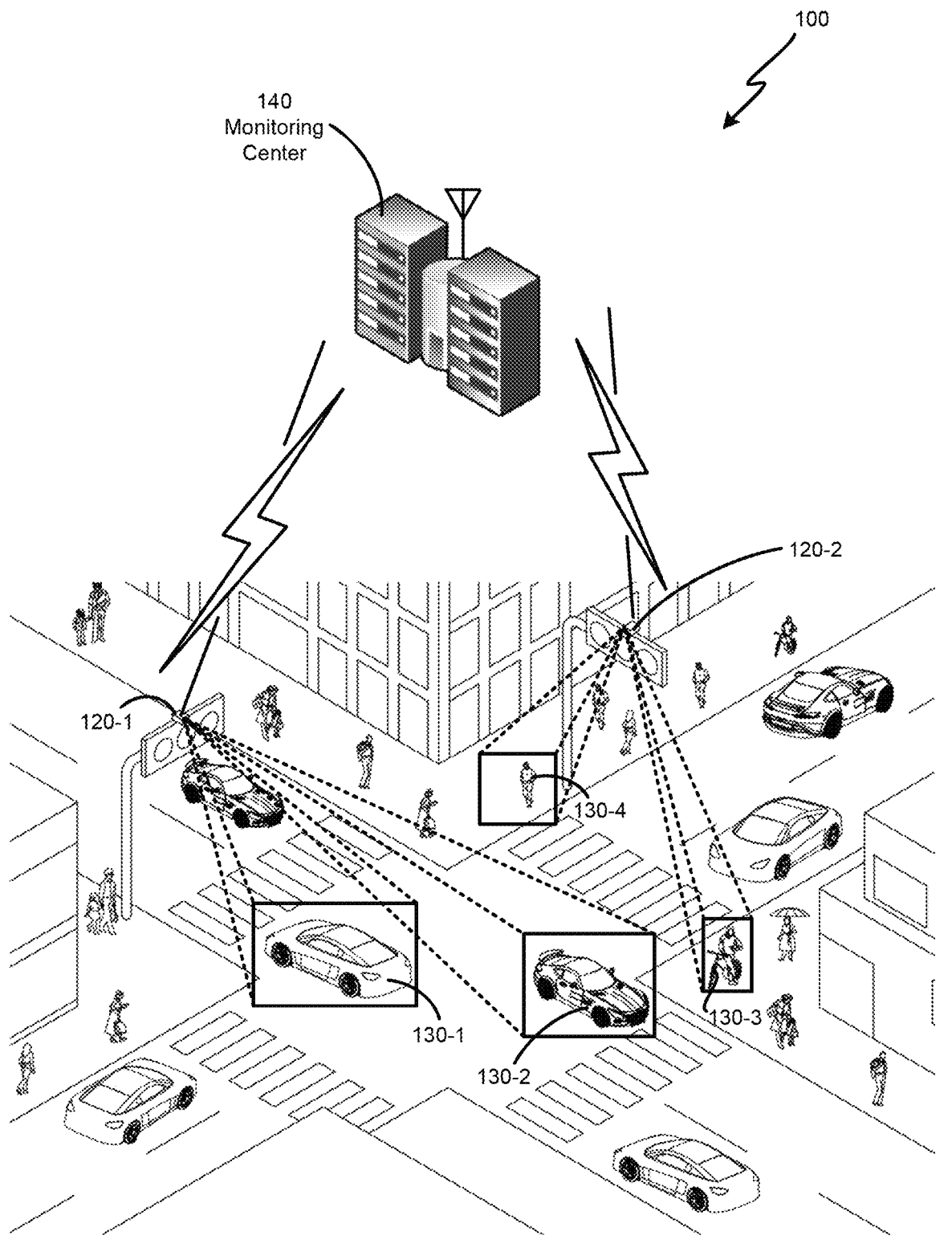
FIG. 1 illustrates a schematic representation of a traffic intersection according to an embodiment of the present disclosure.

Referring to FIG. 1 illustrates a traffic intersection 100 that is equipped with monitoring devices 120-1 and 120-2 mounted on traffic lights. The monitoring devices 120-1 and 120-2 are strategically positioned to oversee traffic flow and objects within respective fields of view of each of the monitoring devices 120-1 and 120-2. Each of the monitoring devices 120-1 and 120-2 incorporates a combination of sensors, including a radar sensor and an image sensor, aimed at scanning, and capturing information about various traffic objects.

The monitoring device 120-1 is oriented to scan and monitor two vehicles 130-1 and 130-2, denoted by scanning lines. The scanning lines are indicated through dashed lines emanating from the monitoring device 120-1. Simultaneously, the monitoring device 120-2 is engaged in capturing data from a bicycle rider 130-3, and a pedestrian 130-4, within a detection range, outlined similarly by the scanning lines.

The monitoring devices 120-1, and 120-2 are integrated with advanced radar sensors capable of collecting point-cloud data, complemented by image sensors capturing visual data. The combination of the radar sensor and the image sensor facilitates a comprehensive assessment of traffic scenarios, enabling the identification, tracking, and analysis of various objects, encompassing vehicles, cyclists, and pedestrians, within the monitored vicinity.

Further, the monitoring devices 120-1 and 120-2 are communicably coupled to a monitoring center 140. The monitoring center 140 serves as a centralized hub responsible for collecting, processing, and analyzing data received from various monitoring devices spread across different locations, such as traffic intersections, highways, or urban areas. The monitoring center 140 functions as a control center equipped with computing systems, databases, and software algorithms that manage and interpret the incoming data streams. The center employs sophisticated algorithms for data fusion, object recognition, trajectory analysis, and traffic pattern identification.

Furthermore, the monitoring center 140 acts as a decision-making authority, utilizing the received information to make informed decisions regarding traffic management, safety measures, and operational interventions. By analyzing the incoming data from multiple monitoring devices, it provides real-time insights into traffic conditions, congestion levels, incidents, and other relevant information. This centralized approach allows for efficient monitoring, quick responses to emergencies, and the optimization of traffic flow across monitored areas.

Overall, the monitoring center 140 serves as the nerve center of a traffic management system, orchestrating the flow of information from various monitoring devices, analyzing the data, and implementing strategies for enhancing traffic efficiency, safety, and overall transportation management. Local to where monitoring information is gathered, sensor fusion to classify and process traffic observations can be performed. For example, the monitoring center 140 may be located in a proximity to the traffic intersection 100. In some cases, the monitoring center 140 monitors multiple traffic intersections and/or serves as a central hub for overseeing and managing traffic-related activities for the multiple traffic intersections. Traffic data can be sent to the monitoring center 140 for management and analysis of traffic data across many different monitoring locations.

Moreover, data from the monitoring devices 120-1 and 120-2 is efficiently transmitted in real-time to a monitoring center 140. This transmission ensures that the acquired information includes radar-generated point cloud data and the image data, is promptly relayed for further analysis and processing. The monitoring center 140 can employ sophisticated algorithms and systems to interpret the transmitted data, enabling comprehensive traffic analysis, object detection, trajectory tracking, and decision-making for traffic management. The monitoring devices 120-1 and 120-2 wirelessly communicate with the monitoring center 140 using various communication protocols and technologies. In some embodiments, the monitoring devices 120-1 and 120-2 transmit the data that is processed by an onboard computer. In some other embodiments, the monitoring devices 120-1 and 120-2 transmit the data that is unprocessed and is processed at the monitoring center 140. The monitoring center 140 may be equipped with sensors and data processing capabilities, typically utilize wireless communication methods such as Wi-Fi, cellular networks (like 4G/5G), and/or dedicated short-range communication (DSRC) protocols. Through these wireless mediums, the monitoring devices 120-1 and 120-2 establish a data link with the monitoring center 140 to transmit real-time information and updates.

In some embodiments, the monitoring devices 120-1 and 120-2 communicate with the monitoring center 140 via a communication network that refers to a short-range communication network, for example, a Bluetooth™ communication network. In some embodiments, a specific distance of a preset communication distance may be set according to actual requirements, and the embodiments of the present application are not limited thereto. For example, in the case where the preset communication distance is 10 meters, the wireless communication network may be a Bluetooth™ communication network.

In some embodiments, the communication network may refer to a long-range network that uses wireless data connections for connecting network nodes, for example, Wi-Fi access points, and enabling telecommunications between network nodes. The cellular wireless communication network implements, for example, a long-term evolution (LTE) technology, and for purposes of illustration, is hereafter referred to as an "LTE network".

The seamless transmission of this data to a centralized monitoring center fosters real-time traffic surveillance, aiding in proactive decision-making and enhancing overall traffic management efficiency.

Figure 2:
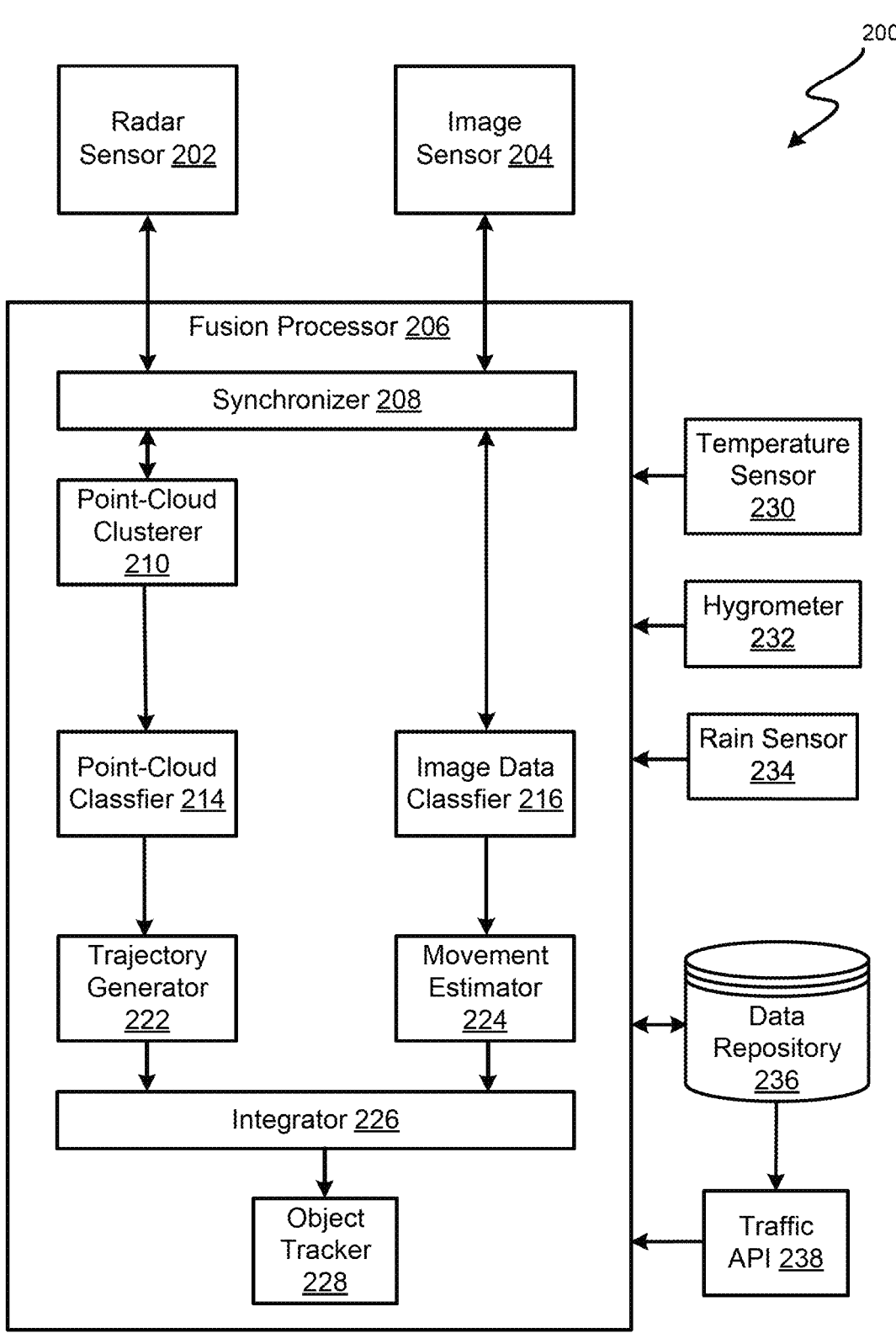
FIG. 2 illustrates a block diagram of a system for monitoring traffic according to an embodiment of the present disclosure.

Referring to FIG. 2, illustrates a block diagram of a system 200 for monitoring traffic. The traffic monitoring system 200 includes a radar sensor 202, an image sensor 204, a fusion processor 206, a synchronizer 208, a point-cloud clusterer 210, a point-cloud classifier 214, an image data classifier 216, a trajectory generator 222, a movement estimator 224, an integrator 226, an object tracker 228, a temperature sensor 230, a hygrometer 232, a rain sensor 234, a data repository 236, and a traffic API (Application Programming Interface) 238.

The traffic monitoring system 200 is designed for traffic monitoring, incorporating various components organized to enhance traffic surveillance, object detection, and data analysis. The radar sensor 202 and the image sensor 204 intricately connected to the fusion processor 206. The radar sensor 202 is configured to obtain a first dataset. The first dataset includes a first spatial coordinates and velocity of traffic objects. In some embodiments, the first dataset the first dataset is a radar point cloud having the first spatial coordinates and Doppler speed information of the traffic objects, the first dataset being captured according to a coverage area of the radar sensor that is fixedly mounted. The radar sensor 202 is fixedly mounted to observe traffic. In some embodiments, the radar sensor 202 operates in a range of 24 Ghz to 77 GHz mmWave band with configurable operation modes and adjustable frequency ramps, allowing flexibility in radar design. A selection of the radar sensor 202 depends on factors like range, field of view, resolution, and the intended use case in the given application domain.

The image sensor 204 configured to obtain a second dataset. The second dataset includes a second spatial coordinates of the traffic objects. The image sensor 204 is fixedly mounted to observe the traffic. In some embodiments, the second dataset is an image data including an arrangement of pixels that create the second spatial coordinates of the of traffic objects, the second dataset being captured according to a field of view of the image sensor that is fixedly mounted. In some embodiments, the image sensor 204 is a charge-coupled device sensor providing high image clarity and precision, such as license plate recognition and monitoring traffic flow. In some embodiments, the image sensor 204 is a complementary metal-oxide-semiconductor sensor. In some embodiments, the image sensor 204 is a high dynamic range (HDR) sensor for providing clear imaging in varying lighting conditions. In some embodiments, the image sensor 204 is a thermal imaging sensor to detect heat signatures emitted by objects, enabling traffic monitoring systems to operate effectively in low visibility conditions like fog, darkness, or adverse weather. The thermal imaging sensor may be used for vehicle and pedestrian detection, especially in conditions where traditional visual cameras might struggle. In some embodiments, the radar sensor 202 and the image sensor 204 are movably mounted to observe the traffic.

The fusion processor 206 is communicably coupled to the radar sensor 202 and the image sensor 204 to synchronize, via the synchronizer 208, the radar sensor 202 with the image sensor 204 for managing a flow of data for the radar sensor 202 and the image sensor 204. The synchronizer 208 refers to a module data performs data coordination and ensures that data acquisition from the radar sensor 202 and the image sensor 204 occurs simultaneously or in a coordinated manner to facilitate accurate fusion and analysis of information. In some embodiments, the synchronizer 208 aligns the timestamps or time references of data obtained from the radar sensor 202 and the image sensor 204. This alignment is relevant for associating data points accurately across sensors, especially when capturing information about the same set of objects or events. In some embodiments, the synchronizer 208 includes protocols for clock synchronization between the radar sensor 202 and image sensor 204. Further, in some embodiments, the synchronizer 208 may perform buffering, queuing, or other techniques to handle the incoming data streams and maintain their synchronization.

In some embodiments the radar sensor 202 and the image sensor 204 are synchronized using Robot Operating System (ROS) messages for coordinated data alignment and data flow from the radar sensor 202 and the image sensor 204. In some embodiments a flow of data for the radar sensor and the image sensor is performed at a rate of synchronization is in a range from 25 milliseconds to 35 milliseconds. In some embodiments, the rate of synchronization is in a range from 26 milliseconds to 34 milliseconds. In some embodiments, the rate of synchronization is in a range from 27 milliseconds to 33 milliseconds. In some embodiments, the rate of synchronization is in a range from 28 milliseconds to 32 milliseconds. In some embodiments, the rate of synchronization is in a range from 29 milliseconds to 31 milliseconds. In some embodiments, the rate of synchronization is 30 milliseconds. The image sensor 204 functions in tandem with the radar sensor 202, however a transmission and/or collection of an image frame by the fusion processor 206 from the image sensor 204 may also be required to be synchronized according to application attributes. In some embodiments, a synchronized frame is in a range from 10 FPS to 20 FPS. In some embodiments, the synchronized frame is in a range from 11 FPS to 19 FPS. In some embodiments, the synchronized frame is in a range from 12 FPS to 18 FPS. In some embodiments, the synchronized frame is in a range from 13 FPS to 17 FPS. In some embodiments, the synchronized frame is in a range from 12 FPS to 16 FPS. In some embodiments, the synchronized frame is in a range from 13 FPS to 15 FPS. In some embodiments, the synchronized frame is at 13 FPS. In some cases, the image frame is synchronized according to a unit of frames per second (FPS), in other set of metric system the image frame is in a range from 50 milliseconds to 100 milliseconds. In some cases, the image frame is synchronized in a range from 60 milliseconds to 90 milliseconds. In some cases, the image frame is synchronized in a range from 70 milliseconds to 80 milliseconds. In some cases, the image frame is synchronized in 75 milliseconds. The fusion processor 206 is further configured to apply a first classifier on the first dataset to generate first classifications, apply a second classifier on the second dataset to generate second classifications; and integrate the first classifications and the second classifications from the radar sensor and the image sensor to generate a composite classification.

In some embodiments, the fusion processor 206 performs clustering of the traffic objects of the first dataset and the second dataset prior to applying the first classifier and the second classifier. The point-cloud clusterer 210 processes the point-cloud data received from the radar sensor 202 and segments the point-cloud data into clusters or groups based on spatial proximity, grouping together points that belong to the same object or entity in the monitored area. In some embodiments, the point-cloud clusterer 210 utilizes clustering algorithms like DBSCAN (Density-Based Spatial Clustering of Applications with Noise) or k-means to identify clusters within the point-cloud data. These algorithms analyze spatial coordinates and possibly additional features like Doppler speed to identify and group together objects within the radar's field of view. By clustering points based on proximity, the point-cloud clusterer 210 processes aids in identifying and delineating separate objects or entities, including but not limited to vehicles, pedestrians, or cyclists within the radar data. In some embodiments, the point-cloud clusterer 210 filters out noise or irrelevant data points that do not belong to any specific object, ensuring that the subsequent processing stages work on meaningful object clusters.

Similarly, the fusion processor 206 operates on the image data captured by the image sensor 204 The image data is grouped into individual pixels or sets of pixels within the image based on visual characteristics. In some embodiments, clustering techniques include K-means, hierarchical clustering, or other computer vision algorithms are used for pixel segmentation and grouping. A spatial arrangement and visual attributes of the pixels are arranged to form clusters representing distinct objects or regions in the image. In some embodiments, the image is segmented into meaningful regions or objects, distinguishing between different elements such as vehicles, road markings, pedestrians, or background areas.

In some embodiments, the fusion processor 206 applies a first classifier on a first cluster of the first dataset to generate first classifications and apples a second classifier on a second cluster of the second dataset to generate the second classifications.

The first classifier is the point-cloud classifier 214 that receives segmented point-cloud data from the first cluster generated from the point-cloud clusterer 210 and extracts relevant features from these clusters, such as spatial coordinates, Doppler speed, object shape, or other characteristics useful for object classification. The point-cloud classifier 214 utilizes machine learning techniques including but not limited to support vector machines (SVM), random forests, neural networks, or custom classifiers trained on labeled radar data. The point-cloud classifier 214 determines the type or class of each detected object within the radar data, aiding in subsequent fusion or decision-making processes.

Similarly, the second classifier is the image data classifier 216 that receives segmented image data from the second cluster. In some embodiments, the image data classifier 216 employs convolutional neural networks (CNNs) or feature extraction algorithms, specifically designed for image recognition tasks, including popular architectures like YOLO (You Only Look Once), Faster R-CNN, or others. These models are trained on labeled image datasets to recognize and classify objects within the image sensor data. A high-level understanding of the visual content in the image data is provided to enable the identification and classification of various objects or elements present in the monitored scene.

In some embodiments, the fusion processor 206 detects the traffic objects by associating detection points to the first cluster according to the first spatial coordinates, and to the second cluster according to the second spatial coordinates. The fusion processor 206 The fusion processor 206 further analyzes individual data points within the first cluster to detect and identify objects based on their characteristics, like shape, size, and proximity of points. The fusion processor 206 further examines the spatial coordinates and features of each point within the first cluster to identify objects. represented by these points. The fusion processor 206 further identifies and tags points belonging to various traffic objects like vehicles, pedestrians, or cyclists based on predefined criteria or machine learning models. The fusion processor 206 further utilizes the first spatial coordinates of the first cluster to link or map the detected objects or points identified within the first cluster.

The fusion processor 206 analyzes individual pixels or groups of pixels within the second cluster to identify objects based on visual attributes, colors, shapes, or patterns. The pixels within are processed to detect objects present in the image data and deep learning models or computer vision algorithms trained on image datasets are used to recognize and detect various traffic objects within the image sensor data. The fusion processor 206 uses the second spatial coordinates (of the second cluster) to link or map the detected objects or regions identified within the second cluster. The functionality of fusion processor 206 allows for the detection and identification of traffic objects at point and pixel levels within their respective datasets. The association of detection points to clusters based on spatial coordinates (first and second spatial coordinates) enables a correlation between the detected objects or points and the specific clusters or regions identified within the point-cloud and image data, respectively. This association facilitates the coherent representation of traffic objects within the overall data clusters, aiding in subsequent analysis, tracking, and classification processes within the traffic monitoring system 200.

In some embodiments, the fusion processor 206 monitor the traffic objects continuously to determine a first trajectories of the traffic objects associated with the radar sensor 202 and a second trajectories of the traffic objects associated with the image sensor 204. The traffic objects are monitored using the velocity and the arrangement of pixels.

The trajectory generator 222 receives continuous radar data containing spatial coordinates, velocity information, and object characteristics from the radar sensor 202 and utilizes the velocity and direction information of the detected traffic objects to generate trajectories within the radar sensor's field of view. A movement of the traffic objects captured by the radar sensor 202 is monitored continuously over time. The trajectory generator 222 predicts and calculates the paths or trajectories of these objects based on the velocities and positions relative to each other. The trajectory generator 222 constructs and represents the first trajectories of the traffic objects associated with the radar sensor 202 and provides a visual or data representation illustrating the movement patterns or paths followed by the detected objects within the radar's coverage area.

The movement estimator 224 utilizes information obtained from the arrangement of pixels in the image sensor 204 and analyzes the changes in pixel positions over consecutive frames to estimate the movement and motion of traffic objects within the image sensor's field of view. The movement estimator 224 estimates the directional changes of traffic objects by examining pixel shifts or movements between frames. The movement estimator 224 performs estimation of the second trajectories using the arrangement of pixels and helps in understanding the movement patterns of various traffic objects captured by the image sensor 204. Both the trajectory generator 222 and the movement estimator 224 contribute to the continuous monitoring and estimation of trajectories for traffic objects detected by the radar sensor 202 and the image sensor 204, respectively. They leverage velocity information from radar data and pixel arrangements from image data to estimate and track the movement paths or trajectories of these objects within their respective sensor fields. This continuous monitoring and trajectory estimation aid in understanding the behavior and movement patterns of traffic objects captured by the radar and image sensors in the traffic monitoring system.

In some embodiments, the fusion processor 206 is further configured to integrate the first classifications and the second classifications by fusing the first classifications and the second classifications through a decision-level fusion process that leverages weighted averaging and/or voting mechanisms to create the composite classification.

In some embodiments, the fusion processor 206 is further configured to integrate the first classifications and the second classifications by fusing the first trajectories and the second trajectories by transforming the first dataset and the second dataset according to spatial attributes of the traffic objects to create a refined trajectory for the of traffic objects, wherein transforming the first dataset and the second dataset involves utilizing a sensor fusion algorithm.

The integrator 226 gathers the first classifications derived from the radar sensor 202, encompassing identification labels or categories for detected traffic objects and collects the second classifications originating from the image sensor 204, representing object identifications or categories obtained through image analysis. The integrator 226 further utilizes a decision-level fusion methodology. In some embodiments, the fusion processor 206 is further configured fuse the first classifications and the second classifications through the decision-level fusion process that involves adjusting weights based on a confidence level of the first classifications and the second classifications. For example, the fusion methodology may be weighted averaging, in which specific weights or significance is assigned to each classification based on its confidence level or reliability. These weights reflect the sensor's performance or accuracy. In another example, the fusion methodology may be a voting mechanism that employs a voting system where each sensor's classification contributes to the final decision. The majority vote or consensus is considered for the composite classification. The integrator 226 integrates the individual classifications obtained from the radar sensor 202 and the image sensor 204 through the chosen decision-level fusion technique and forms a unified, refined, and more reliable composite classification that reflects a consolidated view of the traffic objects detected by both the radar and image sensors. By combining classifications from multiple sensors, the integrator 226 mitigates sensor-specific limitations or errors.

In some embodiments, the fusion processor 206 uses the object tracker 228 to track the traffic objects by utilizing the composite classification and the refined trajectory. The object tracker 228 receives the composite classification to identify and validate types or categories of traffic objects detected in the monitored area. Further, the object tracker 228 receives the refined trajectories, harmonized through sensor fusion to provide accurate movement patterns and spatial information of the traffic objects. The object tracker 228 continuously tracks the movement and positions of the traffic objects over time, creating a history of their paths and locations within the monitored area.

In some embodiments, the first dataset and the second dataset is dynamically adjusted based on the environmental factors. The fusion processor 206 actively receives and interprets data from multiple environmental sensors. The data is used to dynamically adjust parameters of the traffic monitoring system, sensor configurations, or data processing algorithms. This adaptive capability allows the system to maintain optimal functionality and accuracy under varying environmental conditions, enhancing its reliability in traffic monitoring.

The temperature sensor 230 provides real-time temperature data to the fusion processor 206 for environmental monitoring and adaptive adjustments in the sensor data processing. For example, during extreme temperatures, the traffic monitoring system might optimize sensor sensitivity or thresholds to account for potential variations in sensor performance.

The hygrometer 232 measures humidity levels in the atmosphere and collaborates with the fusion processor 206 to provide relevant humidity data that influences adaptive adjustments. For instance, in high humidity conditions, the traffic monitoring system may fine-tune sensor parameters to mitigate potential effects like reduced visibility due to fog or mist.

The rain sensor 234 measures the presence and intensity of rainfall. The integration of the rain sensor with the fusion processor 206 aids in adaptive decision-making based on real-time rain data. For example, the traffic monitoring system might adjust radar sensitivity or image sensor thresholds to compensate for reduced visibility caused by heavy rain. The data repository 236 serves as a centralized storage facility within the traffic monitoring system 200, responsible for storing and managing vast amounts of collected data, including historical and real-time traffic-related information. The data repository 236 may include sensor readings, object detection records, historical traffic patterns, and system configurations. The term "data repository" may refer to any data storage system or combination of storage systems which house data. A data repository may include, e.g., a database, a disk drive, or a cloud storage system. In some embodiments, a data repository may include an organized data storage system configured to house data pertaining to an entity, such as an organization or a government. Such an organized data storage system may be configured to be accessed and/or managed by database control, management, and definition languages. In some cases, an organized data storage system that contains data may be referred to as a "dossier."

The traffic API 238 is an application programming interface that facilitates communication and interaction between the traffic monitoring system 200 and external entities, such as traffic management systems, third-party applications, or other modules within the overall infrastructure. traffic API 238 provides a standardized interface for accessing traffic-related data collected and processed by the monitoring system.

Figure 3:
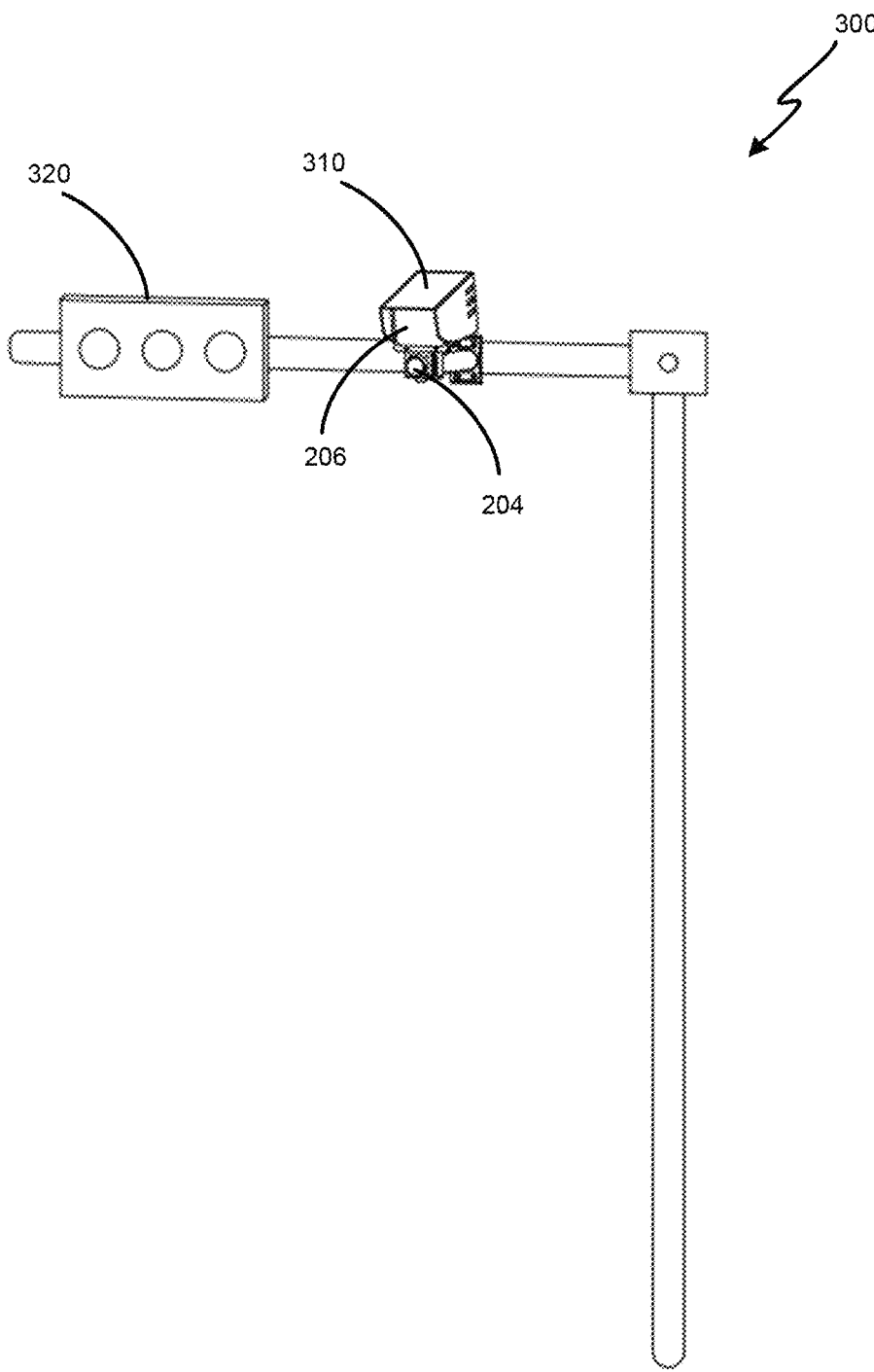
FIG. 3 illustrates a traffic light assembly in a comprehensive traffic monitoring setup according to an embodiment of the present disclosure.

Referring to FIG. 3 illustrates a traffic light assembly 300 in a comprehensive traffic monitoring setup. The traffic light assembly 300 includes traffic lights 320 configured to regulate vehicular and pedestrian traffic flow at an intersection or crossing. Adjacent to the traffic lights 320, a monitoring device 310 (similar to monitoring devices FIG. 1) is strategically positioned to capture and analyze traffic dynamics. The monitoring device 310 incorporates the radar sensor 202 and the image sensor 204 securely mounted for optimal surveillance and data acquisition.

The radar sensor 202 is fixedly mounted within the monitoring device 310, employs radio waves to detect the presence, position, and speed of moving objects within a field of view. Simultaneously, the image sensor 204, also affixed within the monitoring device 310 to capture visual information of the traffic objects, enabling the identification and tracking of vehicles, pedestrians, and other objects through optical means. The combined radar and image sensing capability provides a comprehensive view of traffic scenarios, enhancing the monitoring effectiveness.

The fixed mounting of the radar sensor 202 and image sensor 204 at the monitoring device 310 offers several advantages. Firstly, the stable and stationary positioning ensures consistent and accurate data acquisition by maintaining a constant perspective of the traffic scene. This stability facilitates the synchronization and alignment of data streams from both sensors, enabling cohesive analysis and fusion of radar-derived point cloud data and image-based spatial coordinates.

Additionally, the fixed installation of the radar sensor 202 and image sensor 204 mitigates the need for frequent recalibration or repositioning, ensuring continuous and reliable monitoring without disruptions. It also minimizes potential inaccuracies arising from sensor movement or misalignment, contributing to the precision and consistency of the collected data. This steadfast mounting configuration further optimizes the efficiency of the monitoring device with respect to functionalities.

In conclusion, the fixed mounting arrangement of the radar sensor 202 and image sensor 204 within the monitoring device 310 optimizes traffic monitoring operations by ensuring stable, consistent, and accurate data capture, thereby enhancing the overall effectiveness and reliability of traffic surveillance systems.

Figure 4:
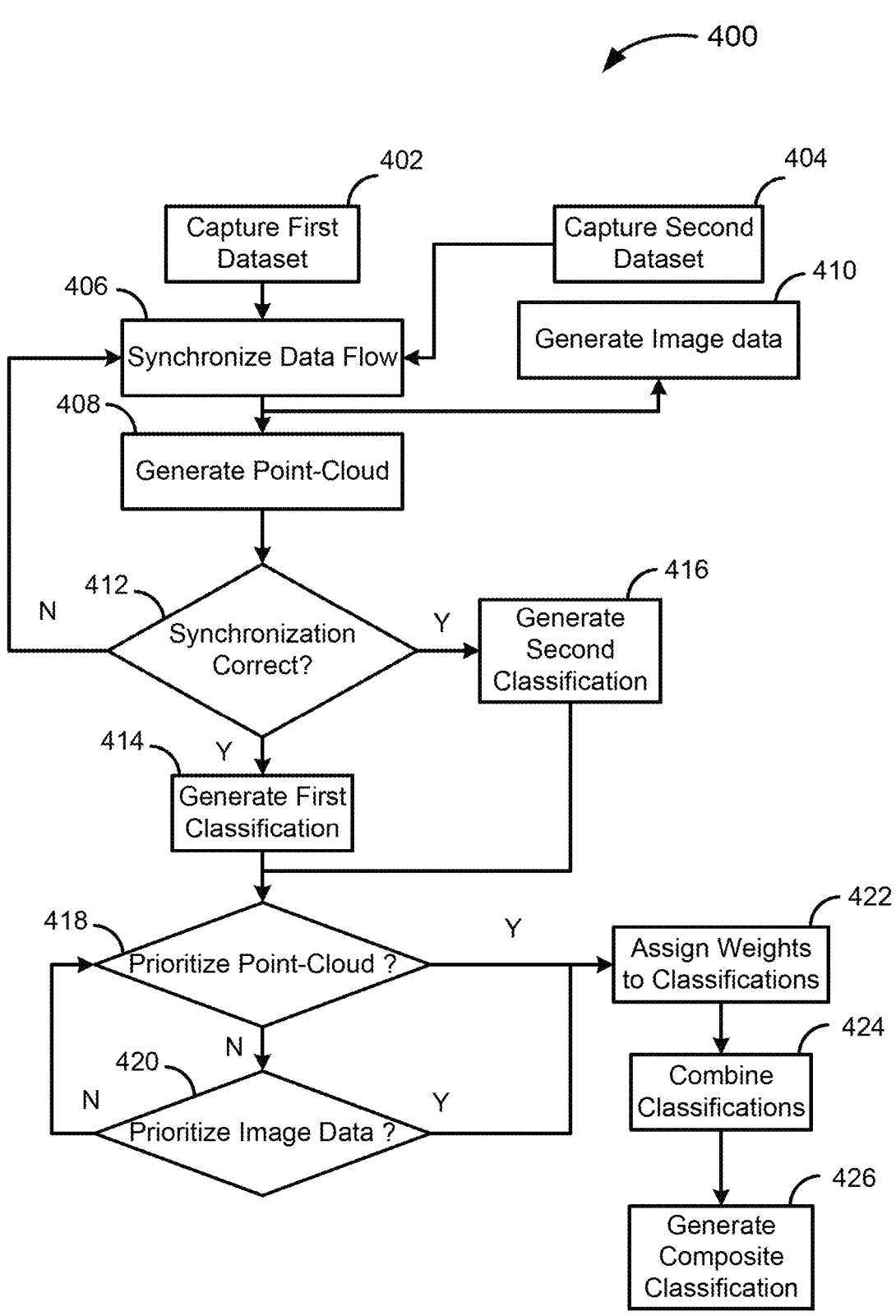
FIG. 4 illustrates a method for performing traffic monitoring by utilizing distinct sensors according to an embodiment of the present disclosure.

Referring to FIG. 4 illustrates a method 400 for performing traffic monitoring by utilizing distinct sensors according to an embodiment of the present disclosure. Some steps of method 400 may be performed by the fusion processor 206 and by utilizing processing resources through any suitable hardware, non-transitory machine-readable medium, or a combination thereof.

At block 402, a first dataset from a radar sensor 202 is obtained. The first dataset includes a first spatial coordinates and velocity of traffic objects. The radar sensor is fixedly mounted to observe traffic. For example, the traffic monitoring system 200 is installed on a highway. The traffic monitoring system 200 includes the radar sensor 202 mounted on a pole overlooking the highway. The radar sensor 202 collects data by emitting radio waves and receiving reflections (echoes) from passing vehicles. The collected data includes the first spatial coordinates (position in space) and velocity (speed and direction) of the traffic objects detected by the radar sensor 202.

At block 404, a second dataset is obtained from the image sensor 204. The second dataset includes a second spatial coordinates of the traffic objects. The image sensor is fixedly mounted to observe the traffic. For example, the traffic monitoring system 200 is installed at an intersection equipped with a camera that is fixedly mounted for capturing images of a road. The camera, functioning as the image sensor 204, records visual data of a traffic scenario.

For instance, in a situation where the image sensor captures snapshots of vehicles, pedestrians, and cyclists moving through the intersection. Each object's location and movement within the camera's field of view are recorded as the second spatial coordinates. The second spatial coordinates include positions of the traffic objects within an image frame. The second spatial coordinates may include the x and y coordinates of the traffic objects.

At block 406, the radar sensor 202 is synchronized with the image sensor 204 for managing a flow of data for the radar sensor 202 and the image sensor 204. The radar sensor 202 collects information on the speed and the first spatial coordinates of the traffic objects, including but not limited to vehicles, pedestrians, or cyclists, passing through a monitored area. Simultaneously, the image sensor 204 captures visual data, providing the second spatial coordinates of the traffic objects within its field of view.

Synchronization between the radar sensor 202 and the image sensor 204 is required accurately process movement and location of the traffic objects. In some embodiments, a Robot Operating System (ROS) is utilized for message exchange and coordination. The ROS facilitates communication between different components of the traffic monitoring system 200. It ensures that data transmitted by the radar sensor 202 (velocity and the first spatial coordinates) and the image sensor 204 (the second spatial coordinates) are time-stamped and synchronized in real-time.

For example, a ROS node of the radar sensor 202 communicates the first captured spatial coordinates and velocity information to another ROS node of the image sensor 204. The messages are exchanged with precise timestamps to align the datasets captured by both sensors. This synchronization is important for accurate correlation and fusion of the information from both sensors later in the method 400.

At block 408 a point-cloud from the first dataset is generated by processing the information from the radar sensor 202. The information creates a three-dimensional representation of the traffic objects detected within a coverage area of the radar sensor 202. A point-cloud or a radar point-cloud is a collection of data points in a 3D coordinate system, where each point corresponds to the spatial location (X, Y, Z) of an object in the field of observation of the radar sensor 202. Additionally, the point-cloud generated from the first dataset includes information about the Doppler speed of the detected objects, providing further insights into the movement of the detected objects.

The point cloud construction involves organizing these detected points in a coherent manner, representing the position and movement of the traffic objects, such as vehicles, cyclists, or pedestrians, within the monitored area. This 3D representation allows for a comprehensive visualization of the traffic scene, facilitating further analysis and processing in the traffic monitoring system 200.

At block 410, image data is generated from the second dataset by capturing visual information of the traffic objects observed within a field of view of the image sensor 204.

For example, the image sensor 204 is fixed at a traffic intersection to captures visual data of traffic flow. As vehicles, pedestrians, or cyclists move within a range of the image sensor 204, visual representation are recorded, essentially forming an image dataset.

Technically, the image data is an arrangement of pixels that collectively create a 2D spatial representation of a traffic scene. Each pixel within the image corresponds to a specific location within a frame. Various algorithms process the image data to identify and categorize objects, such as cars, pedestrians, bicycles, etc., providing essential information for traffic monitoring and management systems.

At block 412, the synchronization between the radar sensor 202 and the image sensor 204 is determined. For instance, the data collected by the radar sensor 202, includes the first spatial coordinates that aligns in time and space with the image data collected by the image sensor 204.

Upon verifying that the radar sensor 202 and the image sensor 204 are accurately synchronized. At block 414, a first classifier is applied on the first dataset to generate first classifications. Here a classification algorithm may be used to generate classifications or labels for the detected traffic objects. When the radar sensor 202 captures data points corresponding to positions and velocities of vehicles, the classification algorithm, such as Support Vector Machines (SVM) or Random Forests, can be applied to this data to classify the detected objects into categories like cars, trucks, motorcycles, or other relevant labels.

At block 416, a second classifier is applied on the second dataset to generate second classifications by using computer vision algorithms to identify and classify various objects and their movements from the second data set. Computer vision algorithms include but are not limited to YOLO (You Only Look Once) or Faster R-CNN. The classification algorithm analyzes the image data, extracting features and patterns that help in identifying different objects within a scene. For instance, using a trained model, the second data set is processed to recognize cars, pedestrians, bicycles, and other relevant entities.

At block 418, a point-cloud is determined to be prioritized. Upon determining that the point-cloud has been prioritized, weights are assigned to the first classifications and the second classifications at block 422. Upon determining that the point cloud has not been prioritized, the image data is determined to be prioritized at block 420. Once the image data is prioritized, the weights are assigned to the first classifications and the second classifications at block 422.

Here decisions are made based on a priority of the data received from different sensors (point cloud data from radar sensor 202 and the image data from the image sensor 204) and then assigning weights accordingly. In the traffic monitoring system 200 both radar and camera sensors are used at an intersection. The radar sensor 202 primarily provides data on the speed and trajectory of vehicles, while the image sensor 204 captures images of vehicles, pedestrians, and other objects. The fusion processor 206 determines which sensor's data is pertinent to the current situation. For instance, during foggy weather conditions, the camera's visibility might be compromised, making the radar data more reliable for detecting and tracking vehicles due to its ability to penetrate fog. In such a case, the fusion processor 206 might prioritize the point-cloud.

If the point-cloud is determined to be more for accurate monitoring (e.g., due to adverse weather conditions affecting visibility), weights are assigned to the classifications derived from both sensors at block 422, giving higher importance to the radar classifications. Conversely, if the image data (from the camera) is determined to be more relevant e.g., clear visibility but radar obstruction due to an obstacle), then weights are assigned to the camera classifications at block 422, prioritizing the camera classifications. This step is important for the fusion process, allowing the system to integrate classifications effectively and make more informed decisions in traffic management, considering the reliability of the data from each sensor in different scenarios.

At block 424, the first classifications and the second classifications are integrated from the radar sensor 202 and the image sensor 204 to generate a composite classification at block 426. The integration or fusion process takes the first classifications and the second classifications that are weighted at block 422 and combines them to generate a composite classification. Weighted averaging or voting mechanisms might be employed, where the classifications from the radar sensor, carrying more weight, have a stronger influence on the final composite classification compared to the classifications from the camera sensor. The composite classification is a unified output that incorporates the strengths of both radar and camera sensor data. The composite classification results from combining the weighted classifications to form a more accurate and comprehensive assessment of the traffic scenario, enhancing the system's ability to manage traffic effectively despite challenging environmental conditions.

Figure 5:
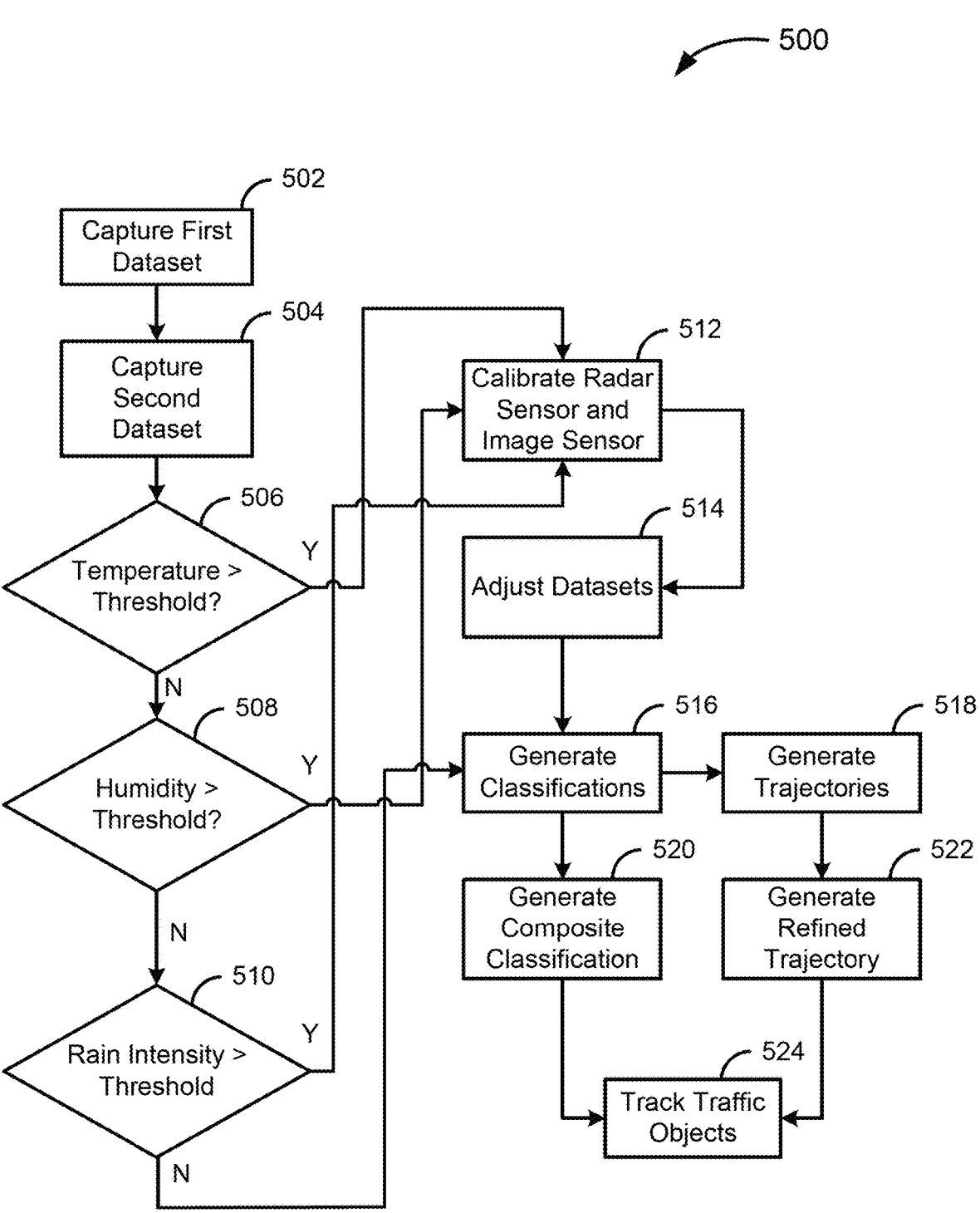
FIG. 5 illustrates a method for performing traffic monitoring by utilizing distinct sensors according to another embodiment of the present disclosure.

Referring to FIG. 5 illustrates a method 500 for performing traffic monitoring by utilizing distinct sensors according to another embodiment of the present disclosure. The method 500 further considers various environmental factors for processing data related to traffic. Some steps of method 500 may be performed by the fusion processor 206 and by utilizing processing resources through any suitable hardware, non-transitory machine-readable medium, or a combination thereof.

At block 502, a first dataset is collected from the radar sensor 202 for subsequent analysis and processing in the traffic monitoring system 200. The radar sensor 202 captures various data parameters, including spatial coordinates indicating position information (e.g., x, y, z coordinates) of traffic objects and velocity information.

At block 504, a second dataset is collected by the image sensor 204. The image sensor 204 gathers data in the form of visual information, typically through capturing images or frames at regular intervals. The image data includes pixel information or an arrangement of pixels that collectively constructs the visual representation of traffic objects.

At block 506, temperature is determined to be above a threshold, which may indicate reading from either of the radar sensor 202 and the image sensor 204 will be impacted in terms of accuracy. Some types of radar sensors and image sensors may be sensitive to temperature changes. Extreme temperatures, whether too high or too low, may impact the accuracy and functionality. Elevated temperatures may affect the performance of electronic components of the radar sensor 202 and the image sensor 204. High temperatures might lead to increased noise, altered sensitivity, or even sensor malfunction. For example, the traffic monitoring system 200 is deployed in a city where temperatures can vary significantly throughout the year, where a normal operating range for this system is between 0° C. and 40° C. When the temperature sensor 230 detects that the temperature has crossed a predefined threshold that is 40° C., and the temperature sensor 230 detects a temperature of 45° C., a response in the traffic monitoring system to recalibrate radar sensor 202 and the image sensor 204 or adjust the first dataset and the second dataset accordingly as shown at block 512 and at block 514. In some cases, temperature-induced inaccuracies are compensated by adjusting the readings or employing algorithms to normalize sensor data.

At block 508, humidity is determined to be above a threshold to signify that a humidity level detected by the hygrometer 232 has surpassed a predefined threshold. In an example, the traffic monitoring system 200 is operating in a region prone to high humidity levels, such as a coastal area. A normal operating range might be between 20% and 80% relative humidity. Crossing the threshold triggers corrective actions that include recalibrating the radar sensor 202 and the image sensor 204 or adjust the first dataset and the second dataset accordingly as shown at block 512 and at block 514.

At block 510, the rain intensity is determined to be above threshold. Heavy rainfall significantly affects camera vision. Raindrops can obscure the field of view, leading to blurred or distorted images. In some cases, rainwater on the camera lens might hinder the capture of clear images, impacting the accuracy of object detection and classification. Rainfall can also influence sensor readings. For instance, rain droplets might interfere with radar signals, affecting the sensor's ability to precisely detect and track objects. Similarly, rain might trigger false positives or negatives in the sensor readings due to reflections or absorption of radar signals by water particles. When the rain sensor 234 detects rain intensity surpassing the set threshold, the traffic monitoring system responds to rain intensity exceeding the threshold by implementing adjustments or recalibrations as shown at block 512 and at block 514. In some embodiments, the traffic monitoring system may also involve altering data processing methodologies to mitigate the impact of rain on data collection for traffic monitoring.

At block 516, classifications are generated from the point-cloud data and the image data, playing an important role in object detection, categorization, and understanding of traffic scenarios. The classifications form the basis for subsequent processing in the traffic monitoring system 200.

At block 518, trajectories are derived from the dataset of the radar sensor 202, which provides 3D movement patterns, while the data set from the image sensor 204 offers visual 2D movement tracks.

At block 520, a composite classification is generated. For example, the composite classification is generated based on a voting mechanism. Referring back to block 510, where the rain intensity surpasses a predefined threshold, the traffic monitoring system receives a signal indicating high rainfall conditions. This signal triggers the voting process, where the rain sensor 234 reports significant rainfall, likely affecting image sensor visibility due to blurred or obstructed views and decides that the radar sensor 202 might offer more reliable classification since it relies on radar waves unaffected by rain, providing consistent point-cloud data. Considering the decreased visibility for the image sensor 204 due to heavy rain, the voting mechanism favors classifications from the radar sensor 202. The composite classification is generated by assigning higher weight or priority to the classifications obtained from the radar sensor.

At block 522, the trajectories from the radar sensor 202 and the image sensor 204 are integrated to create a refined trajectory, and subsequent to the integration of the trajectories and generation of the composite classification, object tracking takes place at block 524. In some embodiments, an advanced object tracking algorithm, such as Multiple Object Tracking (MOT) or Kalman Filters is applied. The advanced object tracking algorithm leverages the composite classification and refined trajectory. By integrating trajectories and leveraging the composite classification, the object tracking process ensures more accurate and reliable monitoring of traffic objects. The output of the object tracking process serves as relevant input for adaptive traffic control, congestion management, incident detection, and other intelligent traffic management systems. The output assists in real-time decision-making and adaptive control strategies to optimize traffic flow and ensure safer road conditions for commuters.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A method for monitoring traffic, the method comprising:

obtaining a first dataset from a radar sensor, wherein:

the first dataset includes a first set of spatial coordinates and a velocity of one or more traffic objects;

obtaining a second dataset from an image sensor, wherein:

the second dataset includes a second set of spatial coordinates of the one or more traffic objects, and wherein the first dataset and the second dataset each is dynamically adjusted based on environmental factors;

synchronizing the radar sensor with the image sensor to coordinate a radar data stream with an image data stream;

applying a first classifier on the first dataset to generate first classifications;

applying a second classifier on the second dataset to generate second classifications; and integrating the first classifications and the second classifications to generate a composite classification.

2. The method for monitoring traffic of claim 1, wherein:

the first dataset is a radar point-cloud having the first set of spatial coordinates and Doppler speed information of the one or more traffic objects, the first dataset being captured according to a coverage area of the radar sensor that is fixedly mounted, and the second dataset is an image data including an arrangement of pixels that create the second set of spatial coordinates of the one or more traffic objects, the second dataset being captured according to a field of view of the image sensor that is fixedly mounted.

3. The method for monitoring traffic of claim 2, wherein the method further comprises:

clustering the one or more traffic objects of the first dataset and the second dataset prior to applying the first classifier and the second classifier;

applying the first classifier on a first cluster of the first dataset to generate the first classifications;

applying the second classifier on a second cluster of the second dataset to generate the second classifications;

detecting the one or more traffic objects by associating detection points to:

the first cluster according to the first set of spatial coordinates, and the second cluster according to the second set of spatial coordinates; and monitoring the one or more traffic objects continuously to determine a first trajectory(ies) of the one or more traffic objects derived from the first dataset and a second trajectory(ies) of the one or more traffic objects derived from the second dataset.

4. The method for monitoring traffic of claim 3, wherein integrating the first classifications and the second classifications involves:

fusing the first classifications and the second classifications through a decision-level fusion process that leverages weighted averaging and/or voting mechanisms to create the composite classification; and fusing the first trajectories and the second trajectories by transforming the first dataset and the second dataset according to spatial attributes of the one or more traffic objects to create a refined trajectory for the one or more traffic objects, wherein transforming the first dataset and the second dataset involves using a sensor fusion algorithm.

5. The method for monitoring traffic of claim 4, wherein fusing the first classifications and the second classifications through the decision-level fusion process involves adjusting weights based on a confidence level of the first classifications and the second classifications.

6. The method for monitoring traffic of claim 4, wherein the method further comprises tracking the one or more traffic objects by using the composite classification and the refined trajectory.

7. The method for monitoring traffic of claim 1, wherein the radar sensor and the image sensor are movably mounted to observe the traffic.

8. The method for monitoring traffic of claim 1, wherein the synchronizing step further comprises using Robot Operating System (ROS) messages to coordinate the radar data stream with the image data stream, and wherein a rate of synchronization is in a range from 25 milliseconds to 35 milliseconds.

9. The method for monitoring traffic of claim 1, wherein:

the first classifier employs neural networks or support vector machines to generate the first classifications from the first dataset, and the second classifier uses convolutional neural networks or feature extraction algorithms to generate the second classifications from the second dataset.

10. A system for monitoring traffic, the system comprising:

a radar sensor configured to obtain a first dataset, wherein:

the first dataset includes a first set of spatial coordinates and a velocity of one or more traffic objects;

an image sensor configured to obtain a second dataset, wherein:

the second dataset includes a second set of spatial coordinates of the one or more traffic objects, and wherein the first dataset and the second dataset each is dynamically adjusted based on environmental factors; and a fusion processor communicably coupled to the radar sensor and the image sensor to:

synchronize the radar sensor with the image sensor to coordinate a radar data stream with an image data stream;

apply a first classifier on the first dataset to generate first classifications;

apply a second classifier on the second dataset to generate second classifications; and integrate the first classifications and the second classifications to generate a composite classification.

11. The system for monitoring traffic of claim 10, wherein:

the first dataset is a radar point-cloud having the first set of spatial coordinates and Doppler speed information of the one or more traffic objects, the first dataset being captured according to a coverage area of the radar sensor that is fixedly mounted, and the second dataset is an image data including an arrangement of pixels that create the second set of spatial coordinates of the one or more traffic objects, the second dataset being captured according to a field of view of the image sensor that is fixedly mounted.

12. The system for monitoring traffic of claim 11, wherein the fusion processor is configured to:

cluster the one or more traffic objects of the first dataset and the second dataset prior to applying the first classifier and the second classifier;

apply the first classifier on a first cluster of the first dataset to generate the first classifications;

apply the second classifier on a second cluster of the second dataset to generate the second classifications;

detect the one or more traffic objects by associating detection points to:

the first cluster according to the first set of spatial coordinates, and the second cluster according to the second set of spatial coordinates; and monitor the plurality of traffic objects continuously to determine a first trajectory(ies) of the one or more traffic objects derived from the first data set and a second trajectory(ies) of the one or more traffic objects derived from the second data set.

13. The system for monitoring traffic of claim 12, wherein the fusion processor is further configured to integrate the first classifications and the second classifications by:

fusing the first classifications and the second classifications through a decision-level fusion process that leverages weighted averaging and/or voting mechanisms to create the composite classification; and fusing the first trajectories and the second trajectories by transforming the first dataset and the second dataset according to spatial attributes of the one or more traffic objects to create a refined trajectory for the one or more traffic objects, wherein transforming the first dataset and the second dataset involves using a sensor fusion algorithm.

14. The system for monitoring traffic of claim 13, wherein the fusion processor is further configured to fuse the first classifications and the second classifications through the decision-level fusion process that involves adjusting weights based on a confidence level of the first classifications and the second classifications.

15. The system for monitoring traffic of claim 13, wherein the fusion processor is further configured to track the one or more traffic objects by using the composite classification and the refined trajectory.

16. The system for monitoring traffic of claim 10, wherein the radar sensor and the image sensor are movably mounted to observe the traffic.

17. The system for monitoring traffic of claim 10, wherein the fusion processor uses Robot Operating System (ROS) messages to coordinate the radar data stream with the image data stream, and wherein a rate of synchronization is in a range from 25 milliseconds to 35 milliseconds.

18. The system for monitoring traffic of claim 10, wherein:

the first classifier employs neural networks or support vector machines to generate the first classifications from the first dataset, and the second classifier uses convolutional neural networks or feature extraction algorithms to generate the second classifications from the second dataset.

* * * * *